Oct. 15, 1957 F. J. JOHNSON 2,809,557
BOMB RACK
Filed April 25, 1955
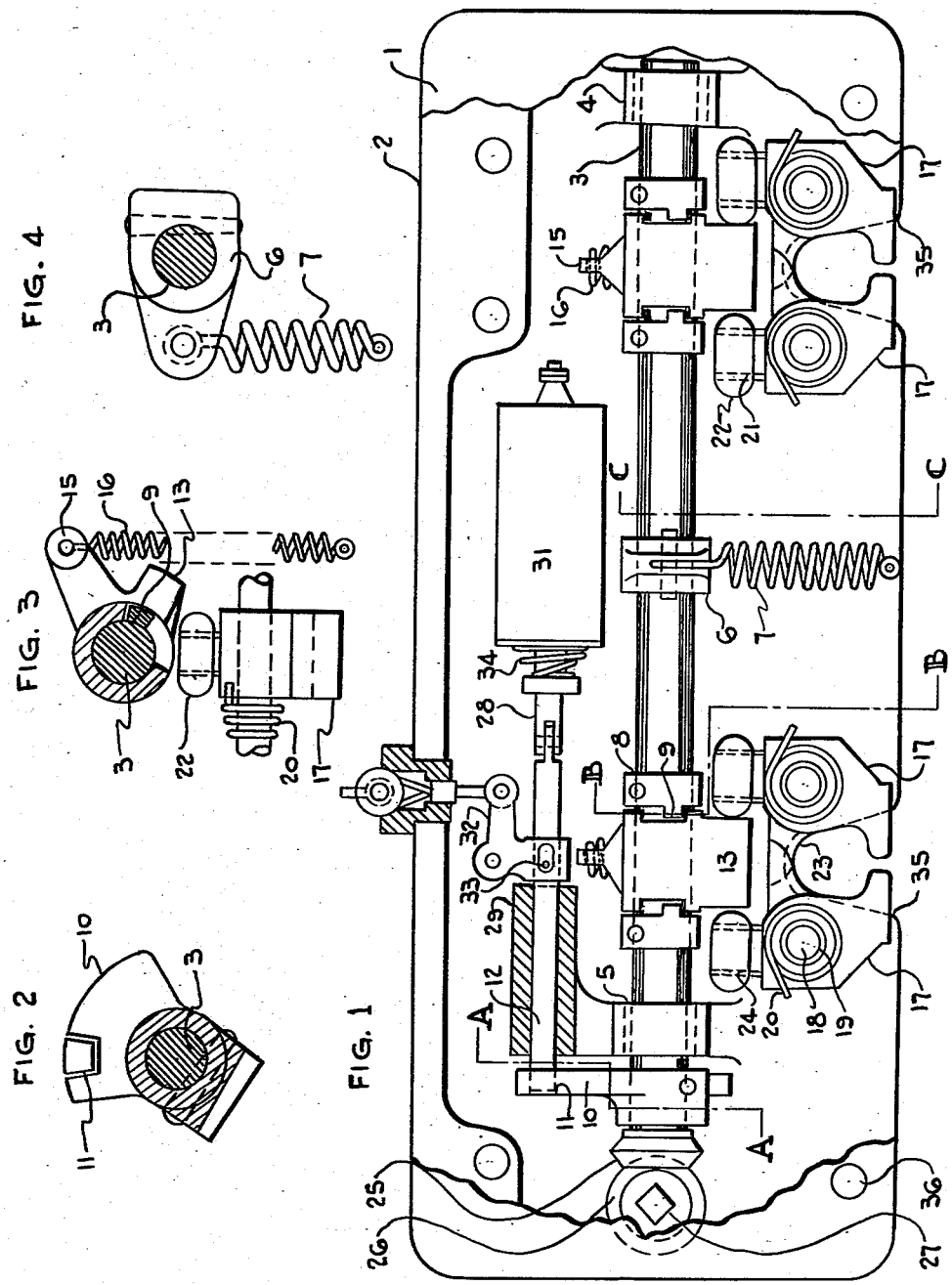
WITNESSES:
Homer P. Brown
Oscar A. Johnson
INVENTOR.
Frank James Johnson

United States Patent Office 2,809,557
Patented Oct. 15, 1957

2,809,557

BOMB RACK

Frank James Johnson, Hatboro, Pa., assignor of one-half to Oscar A. Johnson, Willow Grove, Pa.

Application April 25, 1955, Serial No. 503,589

3 Claims. (Cl. 89—1.5)

This invention relates to improvements in bomb racks.

The present invention has reference to bomb racks, where the bomb is held in the rack and released from the rack by movable hooks.

The object of my invention is to provide a means by which the above operation can be performed with far less mechanism and fewer parts than the conventional bomb rack, thereby reducing the total weight and space requirements of the bomb rack.

A further object of my invention is to provide a mechanism whereby the accuracy required of the various parts is greatly reduced, thereby making for far lower manufacturing costs, interchangeability and longer life.

A further object of my invention is to provide a bomb rack so simple in construction as to require no expert attention, thereby making for a rack requiring little maintenance and trouble free operation.

A further object is to reduce icing and environmental difficulties through the minimizing of the use of pivot points.

A further purpose is to provide a method of obtaining high holding forces, while still requiring low releasing forces, through the use of a basically simple mechanism.

A further purpose is to increase safety of operation through the provision of a positive locking means.

The novel features that I consider characteristic of my invention are set forth with particularity in the appended claims.

The invention itself, however, both is to its organization and its method of operation, together with additional objects and advantages thereof, will best be understood from the following description of a specific embodiment, when read in connection with the accompanying drawing, in which:

Figure 1 shows a bomb rack in part section, the broken lines 1, indicates a front side frame, which is removed in part, to show the operating mechanism of the bomb rack. Figure 1 also shows the bomb rack hooks in locked position.

Figure 2 shows the locking plate taken on line A—A.

Figure 3 shows the locking means taken on line B—B.

Figure 4 shows the locking means taken on line C—C.

2 is the rear side frame.

Shaft 3 is supported in bearings 4 and 5, the said bearings being connected to side frames 1 and 2.

Shaft 3 has rigidly mounted to it a spring bracket, 6; to the spring bracket 6 is connected a tension spring 7. The lower end of the spring is connected to side frame 2.

Shaft 3 also has rigidly fastened to it clutch collars 8. Clutch collars 8 are provided with clutch jaws 9.

Shaft 3 also has rigidly fastened to it a locking plate 10. Locking plate 10 has a slot 11 provided to receive locking detent plunger 12.

Shaft 3 also has mounted on it, cams 13, cams 13 being free to revolve independent of shaft 3.

Cams 13 are also provided with clutch jaws 14. Cam 13 is also provided with projection 15, to which is connected tension springs 16. The lower end of the springs are connected to side frame 2.

Bomb hooks 17 are mounted on short shafts 18, the shafts being supported in bearings 19, carried by side frames 1 and 2.

Torsion springs 20 are connected to short shafts 18, and bomb hooks 17, to force bomb hooks to remain in the open position until bomb shackles are inserted in hook opening 35.

Bomb hooks 17 have pins 21 on their upper ends, on which are mounted rollers 22; integral with bomb hooks 17 are projecting ears 23.

Shaft 3 also has mounted on its end a gear 25. Mating gear 26 has a square 27 on its shaft end to manually rotate shaft 3 against the tension of spring 7 until the slot in locking plate 10 engages detent plunger 12.

Bearing 29 is shown in cross section to clearly show detent plunger 12. Detent plunger is connected to solenoid plunger 28 by coupling 30. Action of solenoid 31, when current is applied, is to withdraw the detent 12 from slot 11.

Bell crank 32 engages pin 33 in detent plunger 12 for the manual release of detent plunger 12.

Spring 34 snaps detent plunger into slot 11 when slot is in alignment with the detent plunger.

Side frames 1 and 2 have openings 35 for the entrance of the bomb shackle between the hook jaws.

Bolt holes 36 secure front frame 1 to rear side frame 2.

Operation of the bomb rack mechanism for loading the bomb in the rack is as follows:

The first operation is to cock the rack. This is performed by rotating the shaft 3 against the tension of spring 7, until the slot in plate 10 engages the detent plunger 11. The mechanism is now locked or cocked.

The hooks are normally held open by the torsion springs 20.

The bomb shackles are now inserted in the frame opening 35. A further upward movement of the bomb shackles engages the ears 23 of bomb hooks, causing the bomb hook jaws to close around the bomb shackle. This opens the rollers 22 on other end of bomb hooks.

The cam 13 is now free to enter the space between the rollers. This is done automatically by the tension of spring 16.

The hook jaws are now locked around the bomb shackle.

The release of the bomb from the rack is accomplished by withdrawing the detent plunger 12, from the locking plate 10. This is done by the solenoid or manually. This allows the tension of the power spring 7 to rotate the shaft, the clutch lugs on the shaft collars engaging the lugs 14 on the cam 13, thereby withdrawing the hook locking cam 13 from between the rollers 22. The weight of the bomb then opens the hook, allowing bomb to drop free.

The bomb rack is now set for its next cocking.

The space between the jaws 14 of hook locking cam 13 allows the shaft to be returned to the cocked position without moving the cam 13, which only goes into locking position between the rollers after the hook jaws are closed.

Although I have shown and described certain specific embodiments of my invention, I am fully aware that many modifications thereof are possible. My invention, therefore, is not to be restricted, except insofar as is necessitated by the prior art and by the spirit of the appended claims.

Having thus described my invention, what I claim as new, and desire to secure by Letters Patent, is:

1. The combination in a bomb rack as described, of a frame for supporting bomb rack mechanism, a rotatable shaft, on said frame, bearings on said frame supporting said shaft, a lever rigidly attached to said shaft, a spring attached to said lever to supply power to rotate said shaft, a locking plate, said locking plate rigidly attached to said shaft, said locking plate having a notch to receive a detent, a solenoid, a detent plunger, said detent plunger attached to said solenoid, operation of said solenoid retracting said detent plunger from said locking plate, a spring, said spring engaging said detent plunger with said locking plate, a manual release, said manual release retracting said detent plunger from said locking plate, a hook locking cam, said cam mounted on said rotatable shaft and free to rotate on said shaft, said cam provided with a projection to receive a spring, said spring attached to said projection and to said frame to position said cam in locking position, said cam also provided with clutch lugs, a clutch, said clutch rigidly mounted on said rotatable shaft, said clutch provided with projecting lugs to engage lugs on said hook locking cam, a bomb hook, said bomb hook pivoted to open and close, said hook comprising a pair of jaws, ears integral with said jaws, said jaws having vertical pins mounted on upper ends, and rollers mounted on said pins.

2. The combination in a bomb rack as set forth in claim 1, further comprising a means of rotating said shaft against said spring tension to engage said detent plunger with said locking plate.

3. The combination in a bomb rack as set forth in claim 2, further comprising a space provided between said lugs on said hook locking cam, said space sufficient to allow said clutch to be placed in cocking position, before said hook rollers are opened to receive said hook locking cam.

References Cited in the file of this patent

UNITED STATES PATENTS

| | | |
|---|---|---|
| 2,466,980 | Bronson | Apr. 12, 1949 |
| 2,548,053 | Pierson et al. | Apr. 10, 1951 |
| 2,604,353 | Pierson et al. | July 22, 1952 |

FOREIGN PATENTS

| | | |
|---|---|---|
| 236,671 | Great Britain | July 14, 1925 |
| 362,332 | Italy | Aug. 22, 1938 |
| 581,889 | Great Britain | Oct. 29, 1946 |